United States Patent [19]

Chen et al.

[11] Patent Number: 4,877,581

[45] Date of Patent: Oct. 31, 1989

[54] CATALYST FOR DEWAXING HYDROCARBON FEEDSTOCK

[75] Inventors: Nai Y. Chen, Titusville, N.J.; Dennis E. Walsh, Richboro, Pa.

[73] Assignee: Mobil Oil Corporation, New York, N.Y.

[21] Appl. No.: 239,257

[22] Filed: Sep. 1, 1988

[51] Int. Cl.$^4$ .............................................. C07C 5/13
[52] U.S. Cl. ..................................... 585/751; 585/739
[58] Field of Search ............................... 585/739, 751

[56] References Cited

U.S. PATENT DOCUMENTS

| Re. 28,398 | 4/1975 | Chen et al. . | |
|---|---|---|---|
| 3,668,113 | 6/1972 | Burbridge et al. . | |
| 3,709,979 | 1/1973 | Chu . | |
| 3,956,102 | 5/1976 | Chen et al. . | |
| 4,016,218 | 4/1977 | Haag et al. . | |
| 4,229,282 | 10/1980 | Peters et al. . | |
| 4,247,388 | 1/1981 | Banta et al. . | |
| 4,257,872 | 3/1981 | LaPierre et al. . | |
| 4,282,085 | 8/1981 | O'Rear et al. | 208/254 R |
| 4,284,529 | 8/1981 | Shihabi . | |
| 4,448,673 | 5/1984 | Shihabi . | |
| 4,510,045 | 4/1985 | Dessau . | |
| 4,518,485 | 5/1985 | LaPierre et al. . | |
| 4,541,919 | 9/1985 | LaPierre et al. . | |
| 4,790,928 | 12/1988 | Cheng et al. | 585/739 |

*Primary Examiner*—Curtis R. Davis
*Attorney, Agent, or Firm*—Alexander J. McKillop; Charles J. Speciale; Malcolm D. Keen

[57] ABSTRACT

A paraffin conversion process for hydroisomerizing a nitrogen and wax-containing hydrocarbon feedstock comprising contacting the feedstock with a catalyst including a ZSM-11 zeolite characterized by an alpha value from about 10 to 50, in combination with a Group VIII metal hydrogenation-dehydrogenation component of platinum or palladium at a temperature of about 400° F. to about 850° F. and at a pressure of from about 200 to about 2000 psig.

15 Claims, No Drawings

CATALYST FOR DEWAXING HYDROCARBON FEEDSTOCK

BACKGROUND OF THE INVENTION

This invention concerns novel paraffin conversion processes for raw paraffinic feeds of hydrocarbons carried out in the presence of crystalline zeolite material.

It has been known in art of petroleum processing to reduce the pour point of hydrocarbon oils by reducing those hydrocarbons which readily solidify (waxes) from the hydrocarbon feedstock. Previously, waxy components had been removed by means of low temperature solvent dewaxing. More recently, however, catalytic techniques have been made available for dewaxing petroleum feedstocks.

A process of that nature developed by British Petroleum is described in The Oil and Gas Journal dated Jan. 6, 1975, at pages 69–73. See also U.S. Pat. No. 3,668,113.

In U.S. Pat. No. Re. 28,398 to Chen et al. a process for catalytic dewaxing is described using a catalyst comprising zeolite ZSM-5.

U.S. Pat. No. 3,956,102 relates to a process involving the hydrodewaxing of petroleum distillates utilizing a ZSM-5 zeolite catalyst.

U.S. Pat. No. 4,247,388 to Banta et al. discloses that the catalytic performance of certain acidic zeolites such as those of the ZSM-5 type in hydrodewaxing operations is improved by controlling the alpha activity of such zeolites to within the range of 55–150, e.g., by treatment with steam. These zeolites can have the original cations replaced, preferably with cations of metals such as manganese and calcium.

U.S. Pat. No. 4,284,529 to Shihabi discloses improvements in pour point reduction by means of catalytic dewaxing employing a catalyst prepared from a ZSM-5 type zeolite having a constraint index of about 1 to 12. This dewaxing process employs a low acidity form of zeolite such as ZSM-5 or ZSM-11 in which the low acidity is imparted by steaming the zeolite to reduce its cracking activity to an alpha value of not less than about 5, followed by base ion exchange with an alkali metal cation to reduce the alpha value to not greater than 1.0. The conditions substantially eliminate the activity of the zeolite for cracking n-hexane. Shihabi indicates that the preferred forms of the zeolite contain no hydrogenation metal component. A preferred catalyst is referred to therein as a pre-steamed NaZSM-5 and is employed to dewax crude oils and other waxy feedstocks in the presence or absence of added hydrogen. These catalysts are effective at start-of-run temperature of about 640° F. and exhibit excellent aging behavior in the presence of hydrogen. However, in the absence of hydrogen these catalysts exhibit a gradual aging requiring a daily increase of about 1°–10° F. in the reaction temperature.

U.S. Pat. No. 4,448,673 to Shihabi describes a high silica-to-alumina ratio acidic crystalline zeolite catalyst of a group, which includes ZSM-5, having increased activity. The zeolite catalyst is prepared by steaming a precursor crystalline aluminosilicate in the hydrogen or ammonium form which has an alpha value of greater than about 20 in the presence of ammonia to provide a crystalline alluminosilicate having an alpha value of from about 10 to about 150 and thereafter ion-exchanging the steamed precursor with an alkali metal cation under conditions effective to further reduce the alpha value to a negligible amount.

U.S. Pat. No. 4,510,045 to Dessau discloses a hydrodewaxing process which includes use of a non-acidic medium pore zeolite, such as ZSM-5, activated by steaming in the presence of binders such as alumina.

U.S. Pat. No. 4,229,282 to Peters et al. is concerned with dewaxing by hydrocracking through use of a nickel-tungsten zeolite catalyst system wherein the alpha value of the zeolite used in the process is at least 140 and ranges up to an alpha value of 200 or greater. The silica-to-alumina ratio in the system is approximately 70 to 1 and is unmodified by steam to reduce the alpha value.

U.S. Pat. No. 4,257,872 to La Pierre et al. involves a dual bed process for catalytic hydrocracking by passing the charge stock first over hydrotreating catalysts (which can include metals or metal oxides of Group VI B and/or Group VIII deposited on a solid porous support oxide such as alumina, titania, zirconia or mixtures thereof) in order to convert sulfur, nitrogen and oxygen derivatives of hydrocarbon to hydrogen sulfide, ammonia, and water while depositing metal contaminant from hydrodecomposition of any organo-metal compounds. The entire effluent from the hydrotreating zone is then passed to a hydrocracking zone over a zeolite catalyst, such as ZSM-5, which is in an alkali metal non-acidic form having an alpha value less than 10 and preferably less than 5. The zeolite catalyst used in this second step may be NaZSM-5.

U.S. Pat. No. 4,541,919 to La Pierre et al. relates to a process for dewaxing of heavy oils using a large pore zeolite which has been modified by coke deposition.

U.S. Pat. No. 4,518,485 to La Pierre et al. requires a 2-step dewaxing process which employs hydrotreating to remove a portion of sulfur and nitrogen compounds, followed by catalytic dewaxing with zeolite beta having a silica/alumina ratio of at least 30 and a hydrogenation/dehydrogenation component under isomerization conditions and at temperatures from 250° C. to 500° C.

U.S. Pat. Application Serial No. 018.112 filed February 24, 1987 now U.S. Pat. No. 4.808,296 and having a common assignee as this application discloses a catalyst composition and method for dewaxing a wax-containing hydrocarbon feedstock which includes a zeolite, especially a ZSM-5, characterized by a silica-to-alumina ratio from about 12 to about 200, a Constraint Index of from about 1 to about 12, and an alpha value of not more than about 50, in combination with a Group VIII metal hydrogenation-dehydrogenation component.

Catalytic dewaxing of the present invention involves shape selective conversion of straight and slightly branched aliphatic compounds of 12 or more carbon atoms. While conversion usually includes cracking the paraffinic components, which can reduce the yield of product having acceptable pour point because of loss of low carbon chains resulting from the cracking, the waxy component can also be reduced by isomerization of the paraffin chains, which does not affect the overall yield of an acceptable product of reduced pour point.

This latter dewaxing activity has been known to occur in the case of large pore zeolites. Large pore zeolites are typically those with a Constraint Index less than 1, or a pore opening greater than about 6–7 angstrom units. However, large pore zeolites are particularly susceptible to poisoning, such as by nitrogen or nitrogen-containing compounds, and thus can require unacceptably high temperatures of over 800° F. in processing to minimize the effect of such poisoning. The processing temperature must be raised as the large pore catalyst ages to maintain catalytic activity. Furthermore, the use of currently available commercial medium pore zeolites such as Ni/ZSM-5 also requires unacceptably high temperatures and gives low yields when processing paraffinic, nitrogencontaining feeds.

It is therefore an object of the present invention to provide a more active medium pore catalyst for use in reducing the pour point of paraffinic feeds, particularly feeds with a high nitrogen content, while at the same time producing higher yields.

It is a further object of the present invention to provide a more active medium pore catalyst for reducing the pour point of paraffinic, high nitrogen content feeds at lower operating temperatures.

It is still another object of the present invention to provide a more active medium pore catalyst for reducing the pour point of paraffinic, high nitrogen content feeds while providing superior catalyst regenerability.

SUMMARY OF THE INVENTION

The present invention is a process for hydroisomerizing a nitrogen and wax containing feedstock by contacting the feedstock under temperature and pressure conditions appropriate for dewaxing with a catalyst composition which includes a ZSM-11 zeolite characterized by preferably having an initial silica-to-alumina ratio from about 12 to about 200, and an alpha value of from about 10 to about 50, in combination with a Group VIII metal hydrogenation-dehydrogenation component of platinum or palladium. The zeolite can be included in a binder as is known in the art, such as a silica or an alumina binder in an amount of, for example, 65% zeolite to 35% binder.

Furthermore, the zeolite has a crystal size of less than about 0.5 micron, and preferably has a crystal size of less than about 0.1 micron.

The platinum or palladium hydrogenation-dehydrogenation component can be incorporated into the medium pore zeolite by impregnation or cation exchange. Ammonium or amine complexes of the metals can be used for exchanging in acidic solutions. The metals can be employed in amounts from about 0.01 to about 5.0 weight percent, and are preferably included in an amount from about 0.1 to about 2.0 weight percent of the zeolite catalyst composite. The exchange can be directly with the metal complex without an intermediate exchange step, or can be performed via known procedures such as ammonium exchange, etc. In one embodiment the platinum can be introduced via ammonium exchange followed by platinum exchange with platinum tetraamine nitrate until the platinum content of the final catalyst is about 1.15% by weight.

The catalyst composition of the present invention can be prepared in a method known to those in the art. However, while it is known that acidity can be regulated by synthesizing high silica-to-alumina ratio zeolites, e.g., greater than 200, or by base exchange, it is believed that optimum performance of the catalyst is achieved by reducing the alpha value through severe steaming of the medium pore zeolite. While the present invention is not to be so limited, it is believed that severe steaming achieves the necessary chemical balance between the acid function and the metal function, while imparting enhanced resistance to nitrogen poisoning. This may be due to unique surface topography achieved in the zeolite as a result of the present procedure. Thus, the low alpha value can be achieved by steaming the catalyst using any combination of water partial pressure, temperature and time such that the appropriate alpha value is achieved, which, in one case, has been found to be about 20. The alpha value is preferably from about 15 to about 30, and most preferably about 20 to about 25.

The current commercial Ni/ZSM-5 process requires high temperatures and gives low yields when processing paraffinic feeds with high nitrogen content.

In contrast to medium pore catalysts, large pore catalysts can produce high distillate yields from nitrogen-containing heavy gas oils, but only at high operating temperatures over 800° F. in order to overcome the tendency of poisoning by the nitrogen-containing compounds.

The present invention offers a method of dewaxing raw paraffinic nitrogen-containing oils to high yields of low pour point product at commercially practical operating temperatures, while also providing superior catalyst air regenerability.

As a result of the present invention, it has now been found that medium pore zeolites which exhibit resistance to poisoning by components such as nitrogen, etc., can be used to provide a high yield of low pour point product. Improved distillate selectivity advantages result from enhanced isomerization and reduced cracking. In addition, this invention is particularly suited to dewaxing crude oils or other waxy stocks. Highly waxy feeds, that is with paraffins above about 40%, can be difficult to process if they contain high levels of nitrogen. In the present invention, however, high nitrogen content paraffinic feeds are dewaxed with a high yield of low pour point product and without requiring the unacceptably high operating temperatures. Furthermore, the catalyst of the present invention exhibits good regenerability, for example, by hydrogen-stripping or oxidative air regeneration.

For a better understanding of the present invention, together with other and further objects, reference is made to the following description, taken in conjunction with the accompanying drawings, and its scope will be pointed out in the appended claims.

DETAILED DESCRIPTION OF THE INVENTION

The present invention involves in one aspect the use of zeolite catalysts which are characterized by preferably having an initial silica-to-alumina ratio of at least 12:1 to about 200:1 and a Constraint Index from 1 to about 12, especially ZSM-11 zeolite. The Constraint Index of the zeolite provides a measure of the extent to which the zeolite controls the access by molecules of various sizes to its internal structure. Generally, the small pore zeolites which provide highly restricted access, have Constraint Indices of above 12 while the large pore zeolites usually have Constraint Indices below 1. ZSM-11 zeolite has a Constraint Index which is usually in the range from about 1 to about 12. A method for determining Constraint Index is described in U.S. Pat. No. 4,016,218 and J. Catalysis 67, 218–222 (1981), together with values of Constraint Index for typical zeolites, to which reference is made for details of the method. Constraint Index is a structural characteristic of the zeolite but is measured by a test based upon its cracking activity. Cracking activity may, of course, be varied by artifices such as steaming, variation of structural silica:alumina ratio and alkali metal exchange.

The ZSM-11 which can be used in the present invention is described in U.S. Pat. No. 3,709,979. The present invention is directed to those zeolites which are of the medium pore variety, such that the Constraint Index selectively admits the appropriate molecular chains which undergo cracking and/or isomerization. The crystal size of the present zeolites should be less than about 0.5 micron, and preferably less than about 0.1 micron.

Furthermore, the acid activity of the zeolite catalyst used in the present invention can be conveniently defined by an alpha scale described in an article published in J. Catalysis, 6, 278-287 (1966), J. Catalysis 61, 395 (1980) and in U.S. Pat. No. 4,016,218. The zeolite catalyst is contacted with hexane at a fixed temperature of 538° F. and the amount of hexane cracked is measured. From this measurement is computed an "alpha" value which characterizes the catalyst for its cracking activity for hexane. The above references are incorporated herein. The alpha scale so described is used herein to define activity level for cracking n-hexane.

Specifically with regard to the present invention, the alpha level is preferably reduced to a value below 50, and more preferably between about 15 and 30, and most preferably between about 20 and 25 by severe steaming of the zeolite catalyst. This alpha is atypically low for zeolite catalysts used in catalytic hydrodewaxing procedures.

The catalyst of the present invention also includes a hydrogenation-dehydrogenation component selected from one of the Group VIII metals, especially platinum or palladium, which can be deposited or incorporated in the zeolite catalyst by methods of exchange known in the art. The hydrogenation-dehydrogenation component of platinum or palladium can be incorporated by impregnation or cation exchange as explained hereinbefore. Usually they are incorporated in amounts from about 0.1 to about 5 weight percent and preferably from about 0.1 to about 2.0 weight percent of the catalyst composite. Preferably, the metal is incorporated in an aluminum to metal intrazeolitic atomic ratio of less than about 30 to 1.

Prior to incorporating the hydrogenation-dehydrogenation component, the zeolite can be mixed with alumina or another binder, such as silica, prior to steaming. Alumina is generally considered the preferred material since, in using it as a binder for the zeolite, the mechanical properties can be improved. Mixing may be carried out by any convenient procedure such as simple physical mixing, ball-milling, or wet mulling. The ratio between the two materials is not critical but will usually be from 10:90 to 90:10 (by weight) and more usually from 20:80 to 80:20. After mixing is complete, the mixture can be formed in convenient shapes for hardening, e.g., by dry pressing or by extrusion. The blends can then be precalcined to stabilize at supported temperatures of about 1000° F. and for about 0.5 to about 10 hours or longer as required.

The feedstocks which can be treated according to the novel process and catalyst of the present invention are any hydrocarbon feeds which require dewaxing processing, but the invention is especially effective with waxy feedstocks containing catalytic poisons such as nitrogen. The invention is suitable for reducing the pour point of highly paraffinic feeds, that is feeds with paraffin content above about 40%, with high pour point. The waxy compounds in highly paraffinic feeds are long chain carbon molecules which tend to crystallize on cooling of the oil to an extent such that it will not flow. Crudes of high pour point will not flow in pipes at temperatures below the pour point. Thus, to be transported by pipelines, the pour point must be reduced.

Feeds that may be upgraded by the use of this invention are hydrocarbon fractions with initial boiling points greater than about 400° F. and end points up to about 1050° F. The invention is particularly suitable for reducing the pour point of high nitrogen, highly paraffinic feeds with initial boiling points > ~400° F. and end points up to ~1050° F. Such feeds may contain from about 100 ppm to about 5000 ppm nitrogen. These hydrocarbon feeds may contain such naturally-occurring organic nitrogenous compounds as, for example, pyrroles, amines, indols, in addition to other classifications of organic nitrogen-containing compounds. Nitrogen containing paraffinic-type residua may also be processed by the use of this invention. In this case higher operating pressures are preferred to accomplish more extensive boiling range conversion.

Conditions for the process in accordance with the present invention can include temperatures in the range from between about 400° to about 850° F., and is preferably conducted in a range of about 500° to about 800° F. and most preferably in a range of about 675° to 750° F. The pressure can be in a range of from about 100 to about 3000 psig and is preferably to about 200 to about 2000 psig, and most preferably 300 to about 600 psig for hydrodewaxing. This ability to reduce the severity of the reaction conditions by use of the present invention is particularly advantageous. Indeed the line-out temperature is considerably lower than that of large pore zeolite and previously available medium zeolites especially when processing waxy feed with high nitrogen content. Highly paraffinic feeds with paraffins contents above about 40% are particularly difficult to process. The present invention is also particularly advantageous in processing these highly paraffinic feeds which contain considerable amounts of nitrogen.

The reaction environment includes hydrogen, at a partial pressure from about 50 to about 2500 psi and is preferably between about 150 to about 1800 psi, while the liquid hourly space velocity (LHSV) is from about 0.1 to about 50 and preferably is about 0.5 to about 4. These conditions can be varied as the feedstock requires, e.g., whether it be crude feedstock and/or distillate fractions, etc. Accordingly, much higher total pressures and higher hydrogen partial pressure can be utilized as needed.

SPECIFIC EXAMPLES OF THE PRESENT INVENTION

Example 1

The following catalysts were prepared:

1. An 0.38% Pt/ZSM-11 catalyst was prepared by steaming a ZSM-11 extrudate having a zeolite content of about 65% supported in an alumina binder present in an amount of about 35%, to an alpha of 20. The supported catalyst was then Pt exchanged and air calcined at 350° C. The Pt dispersion was about 0.65.

2. A modified version of the Pt/ZSM-11 catalyst was provided by twice ammonia exchanging the above described 0.38% Pt/ZSM-11, followed by Pt exchange and air calcination at 350° C. The Pt exchange was performed by directly contacting the catalyst with a solution containing excess Pt, so that the Pt content of the final catalyst was 1.15%, and the Pt dispersion was about 0.85.

Experiments were then conducted to compare the performance of these catalysts against other dewaxing catalysts used in the upgrading of paraffinic nitrogen-containing gas oils.

The other dewaxing catalysts to which the 0.38% Pt/ZSM-11 and 1.15% Pt/ZSM-11 were compared were:

3. 0.7% Pt/ZSM-5 alumina-bound extrudate (65% zeolite, 35% alumina binder) with an alpha of 16–17, prepared in the same manner as the 0.38% Pt/ZSM-11;

4. A commercial ZSM-5 distillate dewaxing (65% zeolite, 35% alumina binder) catalyst with a Ni content of about 1% and an alpha of about 110; and 5. A large pore zeolite catalyst, 0.6% Pt/zeolite Beta alumina-bound extrudate (65% zeolite, 35% binder).

The properties of the feedstock used in the comparative tests are shown in Table 1. As the table shows, the feed had a paraffin content of about 57%, a pour point of 115° F., a nitrogen content of 0.029 weight percent and a basic nitrogen content of 133 ppm.

TABLE 1

| Properties of 700–1000° F. Gas Oil | |
|---|---|
| C, wt. % | 84.98 |
| H/C, atomic | 2.02 |
| H, wt. % | 14.32 |
| O, wt. % | 0.6 |
| N, wt. % | 0.029 |
| S, wt. % | 0.072 |
| Basic N, ppm | 133 |
| Ni, ppm | Not Detected |
| V, ppm | Not Detected |
| Br No. | 1.1 |
| CCR, wt. % | <0.01% |
| Pour Point, °F. | 115 |
| 650° F.−, wt. % | 2.7 |
| 650° F.+, wt. % | 97.3 |
| Paraffins, wt. % | 57.1 |
| Naphthenes, wt. % | 25.3 |
| Aromatics, wt. % | 17.6 |

The 0.38% Pt/ZSM-11, 1.15% Pt/ZSM-11, 0.6% Pt/zeolite Beta and commercial Ni/ZSM-5 catalysts were tested in a standard fixed bed micro unit using 10 cc of extrudate. The 0.7% Pt/ZSM-5 catalyst was investigated using a fixed bed minimicro reactor employing 0.5–1.0 cc of catalyst. Prior to a run, all catalysts received a standard reduction/sulfiding treatment using 2% H$_2$S/H$_2$. The hydrogen circulation and LHSV were maintained at 2500 SCF/BBL and 1, respectively, in all runs. Operating temperature was adjusted to attain target pour point. The target pour point was normally 50° F. although a target of 20° F. was also used in order to demonstrate the efficacy of the present invention.

Results are summarized in Table 2.

TABLE 2

| Catalyst Performance Summary For 50° F. Pour Point Distillate Product (except where noted) | | | | | |
|---|---|---|---|---|---|
| | 0.6% Pt/ Zeolite Beta | Ni/ ZSM-5 | 0.7% Pt/ Steamed ZSM-5 | 1.15% Pt/ Steamed ZSM-11 50° F. / 20° F. | 0.38% Pt/ Steamed ZSM-11 |
| Line-Out Temperature, °F. | ≧800 | ≧760 | 715 | 710 / ~730 | No Line-out |
| 330° F.+ Yield, wt % | ~90 | 60–63 | 60 | 83 / ~77 | Target Pour Point Not Achieved |
| Net | ~28 | 45–50 | 48 | 38 / ~46 | |
| 650° F.+ Conversion | | | | | |

0.38% Pt/steamed ZSM-11 showed no signs of lining out as temperature was increased up to and beyond 775° F. Target pour point could not be sustained.

With 1.15% Pt/ZSM-11, catalyst line-out was achieved at about 710° F. within 5 days and sustained thereafter until arbitrary termination of the experiment at 26 days. 330° + yield during this period was 83% and the 650° F. conversion was 38%.

0.7% Pt/ZSM-5 lined-out at a temperature comparable to 1.15% Pt/ZSM-11 but provided ~20% lower 330° F.+yield while requiring 10% higher 650° F.+conversion.

The 330° F.+yields obtained from 1.15% Pt/ZSM-11 approach those of 0.6% Pt/zeolite Beta large pore zeolite catalyst for this feed, but the large pore zeolite catalyst required operation at temperatures above 800° F. to overcome the effects of high nitrogen in the feed.

As with large pore zeolite catalyst, the calculated cetane index of the 330°–650° F. distillate from Pt/ZSM-11 is high at about 67.

Furthermore, it was found that 1.15% Pt/ZSM-11 lined out at least 50° F. lower than the commercial distillate dewaxing Ni/ZSM-5 catalyst, while providing 20% higher yield of 330° F.+distillate at the target pour point of 50° F. This performance was sustained throughout a 26 day cycle with an aging rate of less than 0.5° F. a day. Even at a lower pour point of 20° F. with a 730° F. reactor temperature, 330° F.+yield remained high. The performance advantages from this catalyst appear to result from substantial isomerization as indicated by the higher yields obtained at lower conversion vs. 0.7% Pt/ZSM-5. The 0.7% Pt ZSM-5 provides activity advantages similar to those of 1.15% Pt. ZSM-11, but 330° F.+yield improvements were considerably more modest.

Example 2

The following catalysts were prepared:

1. A 1.15% PT/ZSM-11 catalyst with an alpha of 20 was prepared as in example 1.

2. A 1.2% Pt/ZSM-5 catalyst with an alpha of 21 was prepared in the same manner as the 1.15% Pt/ZSM-11 in example 1.

3. A conventional commercial Ni/ZSM-5 catalyst with an alpha of 110 was again tested for comparison purposes.

Experiments were performed as in example 1 to compare the performance of these catalysts in the upgrading of paraffinic nitrogen-containing gas oils. Properties of the feed are listed in Table 3.

The properties of the feed were similar to those of the feed used in example 1 with a paraffin content of about 57%, a pour point of 114° F., and a nitrogen content of 0.033 weight percent and basic nitrogen of 110 ppm.

TABLE 3

| Properties of Minas Vacuum Gas Oil | |
|---|---|
| H/C, atomic | 1.95 |
| S, wt. % | 0.090 |
| N, wt. % | 0.033 |
| Basic N, ppm | 110 |
| Ni, ppm | 0.2 |
| V, ppm | <0.05 |
| Br No. | 0.0 |
| CCR, wt. % | 0.04 |
| Pour Point, °F. | 114 |
| 650° F.−, wt. % | 0 |
| 650° F.+, wt. % | 100 |
| Paraffins, wt. % | 57.1 |
| Naphthenes, wt. % | 24.4 |
| Aromatics, wt. % | 18.5 |

An overall summary of catalyst performance, including pertinent data from catalysts tested earlier, is presented in Table 4. Typical material balance information for each catalyst during "lined-out" operation is presented in Table 5.

TABLE 4

Catalyst Performance Summary for 50° F. Pour Point Distillate Product

| | Ni/ZSM-5 | 0.7% Pt/Steamed ZSM-5 | 1.2% Pt/Steamed ZSM-5 | 1.15–1.2% Pt/Steamed ZSM-11 | |
|---|---|---|---|---|---|
| | Example 2 | Example 1 | Example 2 | Example 1 | Example 2 |
| Intrazeolitic H/Pt* | N/A | No Data | 0.36 | 0.42 | 0.35 |
| Line out Temperature, °F. | ~760–765 | 715–720 | 720 | 710 | 726 |
| 330° F.+ Yield, wt. % | ~60 | 58 | 62 | 83 | 76 |
| Net 650° F.+ Conversion, wt. % | 51 | 50 | 45 | 38 | 44 |

*From Hydrogen chemisorption measurements determined after selective poisoning of extra-zeolitic Pt.

TABLE 5

Line-Out Product Distributions @ ~50° F. Pour Point 2500 SCF H$_2$/BBL, LHSV = 1, 400 psig

| | Ni/ZSM-5 | 0.7% Pt/Steamed ZSM-5 | 1.2% Pt/Steamed ZSM-5 | 1.15–1.2% Pt/Steamed ZSM-11 | |
|---|---|---|---|---|---|
| | Example 2 | Example 1 | Example 2 | Example 1 | Example 2 |
| Reactor Temperature, °F. | ~760–765 | 720 | 720 | 710 | 726 |
| Time on Stream, Days | 30 | 21 | 27 | 25.7 | 12.7 |
| CH$_4$ | 0.2 | — | — | — | 0.1 |
| C$_2$'s | 0.6 | — | 0.1 | — | 0.1 |
| C$_3$'s | 6.3 | 5.7 | 6.2 | 1.2 | 2.6 |
| C$_4$'s | 7.4 | 8.4 | 8.4 | 1.8 | 4.0 |
| C - 330° F. | 25.0 | 28.2 | 22.8 | 13.2 | 16.6 |
| 330–650° F. | 11.3 | 9.1 | 7.4 | 24.2 | 20.1 |
| 650–850° F. | 41.4 | 38.0 | 45.1 | 48.8 | 46.5 |
| 850° F.+ | 7.8 | 10.6 | 10.0 | 11.8 | 9.9 |
| Net 650° F.+ Conversion, wt. % | 50.8 | 50 | 45.0 | 38.8 | 43.5 |
| 330° F.+ | 60.5 | 57.7 | 62.5 | 83.8 | 76.5 |
| Yield, wt. % | | | | | |
| Pour Point, °F. | 47 | 50 | 47 | 49 | 47 |
| H$_2$ Consumption SCF/BBL | ~100 | — | ~250 | ~−150 | 115 |
| 330° F.+ Nitrogen, ppm | ~500 | — | ~540 | ~200 | 240 |

In this example, a repeat preparation of the 1.15% Pt/ZSM-11 as in example 1 resulted in a catalyst which gave generally similar dewaxing performance (Tables 4 and 5).

The slightly higher line-out temperature and slightly lower 330° F.+yield for 1.2% Pt/ZSM-11 in this example probably resulted from the slightly lower amount of intrazeolitic Pt (Table 4) which is believed to be the important Pt fraction influencing catalyst performance.

Although the 0.7% Pt/ZSM-5 catalyst investigated in example 1 provided activity advantages over the Ni/ZSM-5 comparable to those of Pt/ZSM-11, it did not show similar improvements in distillate product yield.

In example 2, in vacuum gas oil upgrading, the performance of 1.2% Pt/ZSM-5 was similar to that observed earlier with the 0.7% Pt/ZSM-5 catalyst, as shown in Tables 4 and 5. Also, product yield patterns from both 0.7% and 1.2% Pt/ZSM-5 are quite similar to those obtained using commercial Ni/ZSM-5 distillate dewaxing catalyst. It appears that the higher distillate yield realized with 1.15% Pt/ZSM-11 at comparable pour point, conversion, and intrazeolitic Pt content results from its intrinsically higher isomerization selectivity. The higher distillate yield with 1.15% Pt/ZSM-11 as compared with its ZSM-5 counterpart manifests itself in a significantly larger amount of 330°–650° F. product at the expense of gas and naphtha yields.

As noted in example 1, compared to Pt/ZSM-11, higher 330° F.+yields can be obtained with large pore zeolite, but prohibitively high temperatures of about 800° F. are required to overcome the effects of feed nitrogen poisons.

Example 2 shows, therefore, that raw gas oil processing results obtained with ZSM-5 and ZSM-11 having comparable total and intrazeolitic Pt contents confirm that both catalysts require lower operating temperatures and can provide significant activity advantages over conventional Ni/ZSM-5 catalysts. However, only the ZSM-11 catalyst provides significant distillate yield advantages indicating that Pt/ZSM-11 possesses hydroisomerization selectivity intrinsically superior to Pt/ZSM-5 for raw gas oil dewaxing.

Example 3

Hydrogen chemisorption experiments were conducted to clarify characteristics required for attaining performance improvements and preferred preparation procedures.

Results obtained before and after selective poisoning of extrazeolitic Pt were coupled with estimates of the tetrahedral aluminum content of the steamed catalyst. Results indicated that for activity advantages with Pt/ZSM-5 and activity/distillate yield advantages with Pt/ZSM-11 the atomic ratio of tetrahedral Al:intrazeolitic Pt should be < ~30:1.

Example 4

As shown in example 3, adequate intracrystalline Pt is important for balancing, with sufficient intimacy, the acid and metal functions of Pt/ZSM-11. Oxidative regeneration can cause a decline in the amount of intracrystalline Pt and a deterioration in catalyst performance. This example determined that the Pt/ZSM-11 was air regenerable without such loss of performance capability.

The catalyst used in this example was the same 1.15% Pt/steamed ZSM-11 described in example 1.

Properties of the feed were similar to those used in examples 1 and 2 with a paraffin content of about 57%, a pour point of 115° F. and a nitrogen content of about 300 ppm.

Prior to regeneration, the used catalyst was washed with toluene to remove any soluble hydrocarbon residue, and dried overnight at 105° C. The catalyst was then regenerated according to the procedure shown in Table 6. As shown in Table 6 the used catalyst was held in a mixture of flowing nitrogen, air and water while the temperature was raised to 455° C. The catalyst was then held at 455° C. for 24 hours.

After catalyst regeneration, dewaxing runs were performed as in example 1 with a 50° target pour point.

TABLE 6

Wet Air Regeneration of Pt/Steamed ZSM-11 at 80 psiq

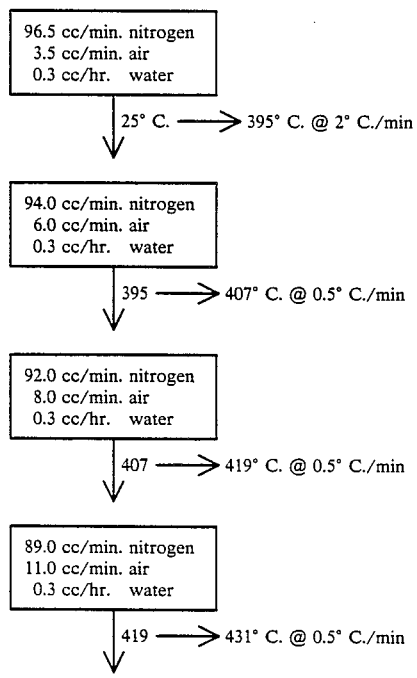

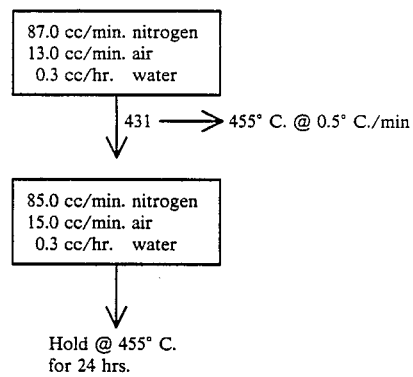

TABLE 6-continued

Wet Air Regeneration of Pt/Steamed ZSM-11 at 80 psiq

Results of the dewaxing runs are summarized in Table 7. Yields of target point product remained high after two catalyst regenerations with line-out temperatures of between 705° and 717° F.

TABLE 7

| Dewaxing Over 1.15% Pt/Steamed ZSM-11 | | | |
|---|---|---|---|
| | 1st Cycle | 2nd Cycle | 3rd Cycle |
| Line Out Temperature for 50° F. Pour Point | 705–710 | 705–710 | 717 |
| 330° F.+ Yield | 83 | 83 | 82 |
| 650° F.+ Conversion, wt % | 39 | 39 | 43 |

Thus, while there have been described what are presently believed to be the preferred embodiments of the present invention, those skilled in the art will realize that variations may be made thereto without departing from the spirit of the invention and it is intended to claim all such variations and modifications as come within the true scope of the invention.

What is claimed is:

1. A paraffin conversion process for hydroisomerizing a nitrogen and wax-containing hydrocarbon feedstock comprising:
   contacting said hydrocarbon feedstock with a catalyst including a ZSM-11 zeolite which has been steamed to achieve an alpha from about 10 to about 50, in combination with a Group VIII metal hydrogenation-dehydrogenation component selected from the group consisting of platinum and palladium at a temperature of about 400° F. to about 850° F. and at a pressure of from about 200 to about 2000 psig.

2. The process of claim 1, wherein said metal is incorporated in said zeolite in an amount of from about 0.01 to about 5.0% by weight of said zeolite catalyst.

3. The process of claim 1, wherein said metal is incorporated in said zeolite in an amount of from about 0.1 to about 2.0% by weight of said zeolite catalyst.

4. The process of claim 1, wherein said metal is incorporated in said zeolite in a tetrahedral aluminum to intrazeolitic platinum atomic ratio of less than about 30 to 1.

5. The process of claim 1, wherein said zeolite is subjected to an intermediate ammonium exchange prior to further Pt exchange.

6. The process of claim 1, wherein said zeolite catalyst is supported in a binder selected from one of silica and alumina.

7. The process of claim 6, wherein the composite resulting from said supported zeolite is about 65% zeolite and about 35% alumina.

8. The process of claim 1, wherein said alpha value is from about 15 to about 30.

9. The process of claim 1, wherein said alpha value is about 20 to about 25.

10. The process of claim 1, wherein said feedstock contains nitrogen components of above about 100 ppm.

11. The process of claim 1, wherein said feedstock contains paraffins of above about 40% by weight.

12. The process of claim 1, wherein said feedstock contains nitrogen components of above about 100 ppm and paraffins of above about 40% by weight.

13. The process of claim 1, wherein said temperature is from about 500° to about 800° F.

14. The process of claim 1, wherein said temperature is from about 675° to about 750° F.

15. The process of claim 1, wherein said pressure is from about 300 to about 600 psig.

* * * * *